（12）United States Patent
Ha

(10) Patent No.: US 10,450,978 B2
(45) Date of Patent: Oct. 22, 2019

(54) METHOD FOR CONTROLLING BACK PRESSURE VALVE

(71) Applicants: HYUNDAI MOTOR COMPANY, Seoul (KR); KIA MOTORS CORPORATION, Seoul (KR)

(72) Inventor: Chang Hyun Ha, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 411 days.

(21) Appl. No.: 14/933,738

(22) Filed: Nov. 5, 2015

(65) Prior Publication Data

US 2017/0016403 A1     Jan. 19, 2017

(30) Foreign Application Priority Data

Jul. 14, 2015  (KR) ........................ 10-2015-0100072

(51) Int. Cl.
    *F02D 41/02*    (2006.01)
    *F02D 41/00*    (2006.01)
    *F02D 21/08*    (2006.01)
    *F02D 41/12*    (2006.01)

(52) U.S. Cl.
    CPC ......... *F02D 41/0225* (2013.01); *F02D 21/08* (2013.01); *F02D 41/0065* (2013.01); *F02D 41/0097* (2013.01); *F02D 41/12* (2013.01); *F02D 2200/0614* (2013.01); *F02D 2200/101* (2013.01); *F02D 2250/34* (2013.01); *Y02T 10/47* (2013.01)

(58) Field of Classification Search
CPC ............ F02D 21/08; F02D 2200/0614; F02D 2200/101; F02D 2250/34; F02D 41/0065; F02D 41/0097; F02D 41/0225; F02D 41/12; Y02T 10/47
See application file for complete search history.

(56) References Cited

U.S. PATENT DOCUMENTS 4,665,692 A * 5/1987 Inaba ...................... F01N 1/165
    123/323
5,836,851 A * 11/1998 Ruman ................. F02B 61/045
    477/107
6,230,697 B1 * 5/2001 Itoyama .................... F02D 9/04
    123/568.21

(Continued)

FOREIGN PATENT DOCUMENTS

| JP | 2005155534 A | 6/2005 |
| JP | 2005282534 A | 10/2005 |

(Continued)

*Primary Examiner* — Carl C Staubach
(74) *Attorney, Agent, or Firm* — Brinks Gilson & Lione

(57) ABSTRACT

A method for controlling a back pressure valve may include: an operation of sensing, by a controller, an engine speed and a fuel injection rate; an operation of comparing the engine speed with a preset speed and comparing the fuel injection rate with a preset injection rate after the operation of sensing; and a first control operation of, when a result of the operation of comparing indicates that the engine speed is less than the preset speed and that the fuel injection rate is less than the preset injection rate, controlling a control constant of the back pressure valve to be set to a compensation value that is less than a reference value.

4 Claims, 4 Drawing Sheets

(56) References Cited

U.S. PATENT DOCUMENTS

| | | | | |
|---|---|---|---|---|
| 7,934,486 B1* | 5/2011 | Styles | ............... | F01N 3/2066 |
| | | | | 123/406.23 |
| 2005/0022511 A1* | 2/2005 | Miura | ............... | F02B 47/08 |
| | | | | 60/285 |
| 2011/0154820 A1* | 6/2011 | Osburn | ............... | F02D 41/0007 |
| | | | | 60/605.2 |
| 2011/0276251 A1* | 11/2011 | Kang | ............... | B60K 6/48 |
| | | | | 701/103 |
| 2014/0123630 A1* | 5/2014 | Eckhoff | ............... | F01N 3/035 |
| | | | | 60/274 |
| 2015/0198106 A1* | 7/2015 | Ishibashi | ............... | F02D 23/02 |
| | | | | 123/445 |

FOREIGN PATENT DOCUMENTS

| | | |
|---|---|---|
| KR | 20090129464 A | 12/2009 |
| KR | 20120054713 A | 5/2012 |

* cited by examiner

METHOD FOR CONTROLLING BACK PRESSURE VALVE

CROSS-REFERENCE TO RELATED APPLICATION

The present application claims priority to Korean Patent Application No. 10-2015-0100072, filed Jul. 14, 2015, the entire contents of which is incorporated herein for all purposes by this reference.

FIELD

The present disclosure relates to a method for controlling a back pressure valve in such a way that a control constant of the back pressure valve is varied to prevent noise from being generated.

BACKGROUND

Generally, exhaust gas generated from engines contains plenty of harmful ingredients such as CO, HC, nitrogenous compound (NOx), etc. To reduce emission of pollutant gas such as NOx, exhaust gas recirculation (EGR) systems are typically used.

In such an EGR system, some exhaust gas, which is discharged after combustion, is supplied to and mixed with an intake gas mixture and then drawn into a combustion chamber. Thereby, the density of the gas mixture is reduced without changing the air-fuel ratio of the gas mixture, and thus the combustion temperature is reduced.

That is, in the EGR system, when there is a need for reducing emission of pollutant gases such as NOx, depending on conditions of the operation of the engine, some exhaust gas is added to intake gas through an EGR valve before being supplied along with the gas mixture into the combustion chamber. Here, exhaust gas which is drawn into the combustion chamber is inert gas, and the volume of intake gas does not change. Therefore, the density of gas mixture is relatively reduced, so that flame spreading speed is reduced, and thus combustion speed is also reduced. Hence, an increase in the combustion temperature is prevented. As a result, emission of pollutant gas such as NOx is reduced.

In particular, a low pressure exhaust gas recirculation (LP-EGR) system is configured such that a valve is provided on a rear end of a turbocharger so that exhaust gas can be supplied to a front end of a compressor of the turbocharger and recirculated, thus reducing emission of nitrogenous compounds (NOx).

To employ such an LP-EGR system, a differential pressure must be formed. For this, a back pressure valve is generally used to increase back pressure on a rear end of a diesel particulate filter (DPF), and thus form differential pressure. A DPF is a post-processing apparatus. The back pressure valve is configured such that the degree of opening of a flap is adjusted by an actuator provided in the valve, so as to control the magnitude of differential pressure in the rear end of the DPF.

In conventional techniques, the control constant of the back pressure valve is set to be comparatively large so that responsiveness of the valve is relatively high. However, if the back pressure valve is operated with a comparatively large control constant under conditions such as idling conditions in which noise of the engine is comparatively small, there is a problem in that a driver may feel discomfort because of noise generated from gears of the actuator.

The foregoing is intended merely to aid in the understanding of the background of the present disclosure, and is not intended to mean that anything disclosed in the present disclosure is already known to those skilled in the art.

SUMMARY

The present disclosure has been made keeping in mind the above problems occurring in related art, and the present disclosure is intended to propose a control method that controls a control constant of a back pressure valve so as to vary depending on an engine speed and a fuel injection rate, thus reducing the problem of noise from the back pressure valve.

In an exemplary form of the present disclosure, there is provided a method for controlling a back pressure valve, including: an operation of sensing, by a controller, an engine speed and a fuel injection rate; an operation of comparing the engine speed with a preset speed and comparing the fuel injection rate with a preset injection rate after the operation of sensing; and a first control operation of, when a result of the operation of comparing indicates that the engine speed is less than the preset speed and the fuel injection rate is less than the preset injection rate, controlling a control constant of the back pressure valve to be set to a compensation value that is less than a reference value.

A method may further include an operation of, before the operation of sensing, determining a position of a shift gear, and conducting the first control operation when a result of the operation of determining is a determination that the shift gear is in a park (P) or neutral (N) position.

When a result of the operation of determining is a determination that the shift gear is in a drive (D) or reverse (R) position, the operation of sensing may be conducted.

A method may further include an operation of, when a result of the operation of comparing indicates that the engine speed is the preset speed or more, or that the fuel injection rate is the preset injection rate or more, sensing whether a vehicle satisfies an exhaust gas recirculation (EGR) valve shut-off condition. When a result of the operation of sensing whether the vehicle satisfies an EGR shut-off condition indicates that the vehicle satisfies the EGR valve shut-off condition, the first control operation may be conducted.

A method may further include a second control operation of, when a result of the operation of sensing whether the vehicle satisfies an EGR valve shut-off condition indicates that the vehicle does not satisfy the EGR valve shut-off condition, controlling the control constant of the back pressure valve to be set to the reference value.

In the second control operation, when, at an initial stage, the control constant of the back pressure valve is set to the compensation value, the control constant may be controlled in such a way that the control constant remains set to the compensation value for a predetermined time and is then changed to the reference value.

In a method for controlling a back pressure valve according to the present disclosure, a control constant of the back pressure valve is controlled to vary depending on an engine speed, a fuel injection rate, a position of a shift gear, and shut-off conditions of an EGR valve. The problem of noise generated from the back pressure valve can be solved, and responsiveness of the back pressure valve can be maintained at the same level as that of the conventional technique.

DRAWINGS

The above and other objects, features and other advantages of the present disclosure will be more clearly under- FIG. 1 is a flowchart showing a method for controlling a back pressure valve;

DETAILED DESCRIPTION

A method for controlling a back pressure valve according to an exemplary form of the present disclosure will be described in detail with reference to the accompanying drawings.

Figure 1:
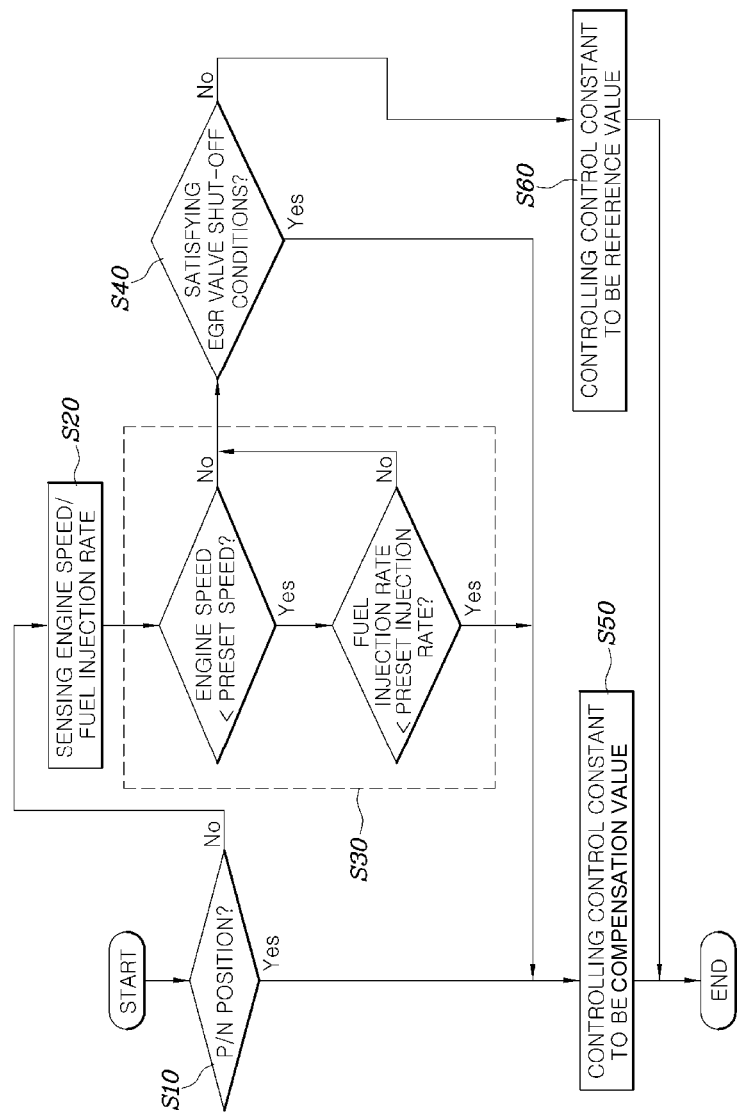
Figure 2:
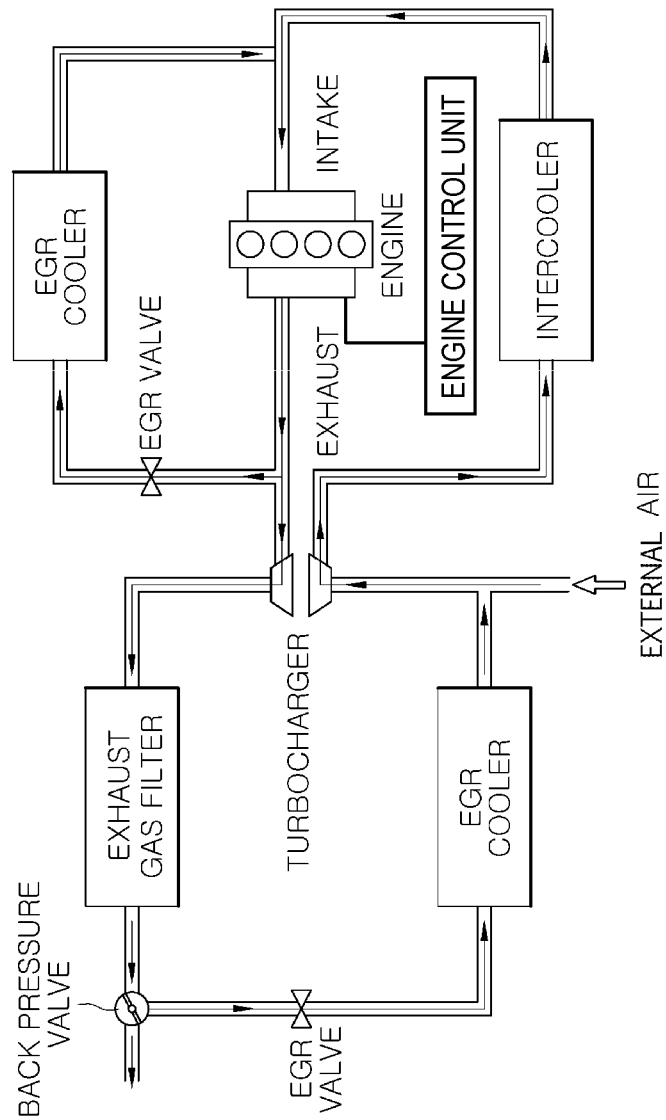
FIG. 2 is a view illustrating an exhaust gas recirculation (EGR) system.

In FIGS. 1 and 2, a control method includes: operation S20 of sensing, by a controller of an engine control unit that is in communication with an engine, an engine speed and a fuel injection rate; operation S30 of, after the sensing operation S20, comparing the engine speed with a preset speed and comparing the fuel injection rate with a preset injection rate; and a first control operation S50 of, when a result of the comparison operation S30 indicates that the engine speed is less than the preset speed and that the fuel injection rate is less than the preset injection rate, controlling a control constant of the back pressure valve to be set to a compensation value that is less than a reference value.

The controller is configured to use sensors, which respectively sense the rotations per minute (RPM) of the engine and the fuel injection rate, so as to obtain information about the engine speed and the fuel injection rate.

If the received engine speed and fuel injection rate are respectively less than the preset engine speed and the preset injection rate, it can be determined that the vehicle is in a tip-in state, in which a driver gently manipulates an accelerator pedal while the vehicle is stopped in an idle state. When the vehicle that is stopped in the idle state enters the tip-in state, the noise level generated from the engine is comparatively low. Thus, when the back pressure valve is operated, noise may be generated from the back pressure valve.

Therefore, the controller is configured to adjust the control constant of the back pressure valve to be set to the compensation value, which is less than the existing reference value, and then to control the back pressure valve using the compensated control constant, thus reducing the noise level generated from the back pressure valve. As the control constant of the back pressure valve is reduced, the operation speed of the back pressure valve is also reduced, and thus responsiveness of the back pressure valve is reduced. In the tip-in state, there is no need for rapidly controlling the back pressure valve. Thus the compensation operation of reducing the control constant of the back pressure valve can be conducted to reduce noise, and thus the marketability of the vehicle can be improved. The control constant of the back pressure valve may include a P-gain value and an I-gain value.

Figure 3:
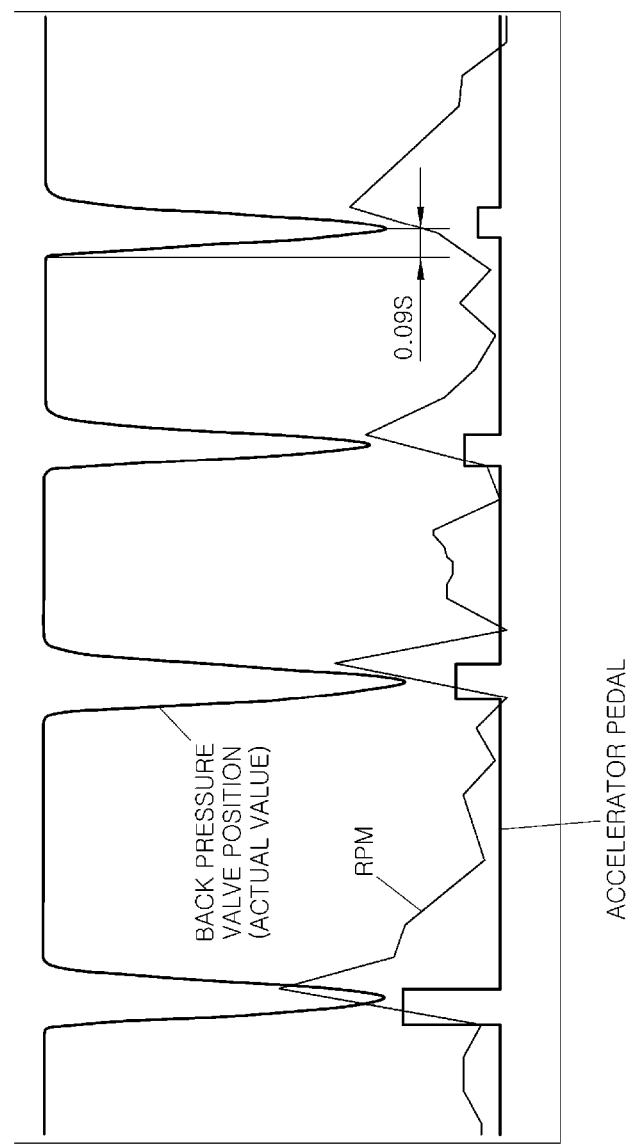
FIG. 3 is a graph showing a response speed of a back pressure valve when a control constant is set to a reference value.

In FIG. 3, when the control constant of the back pressure valve is set to the reference value, the time it takes to completely close a completely opened back pressure valve is 0.09 seconds. That is, the responsiveness of the valve is comparatively high.

Figure 4:
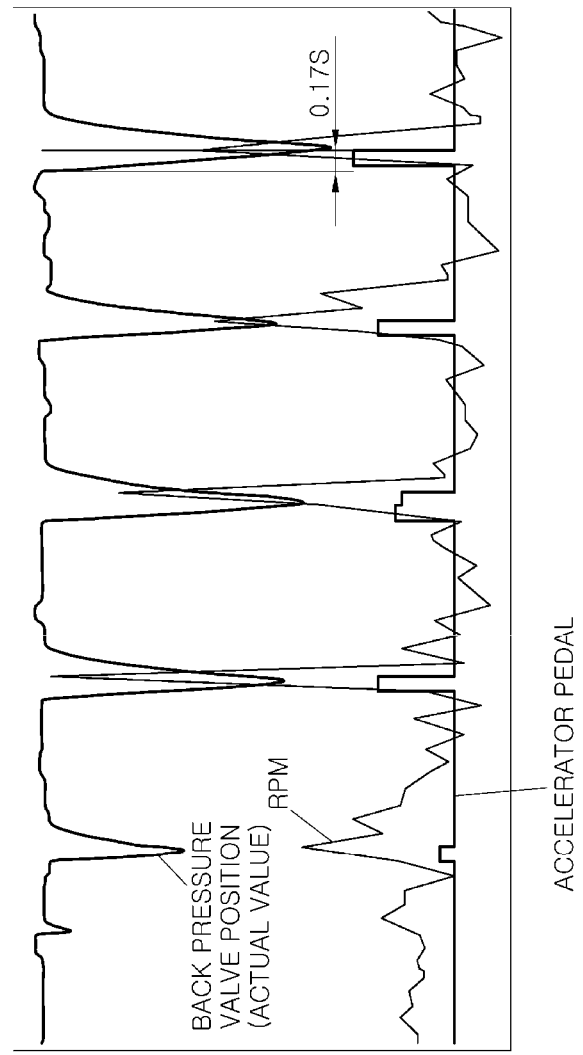
FIG. 4 is a graph showing a response speed of a back pressure valve when a control constant is set to a compensation value.

In FIG. 4, when the control constant of the back pressure valve is adjusted to the compensation value, the time it takes to completely close a completely opened back pressure valve is 0.17 seconds. That is, it can be understood that the responsiveness of the back pressure valve is lower than that of the case where the valve is controlled using a control constant set to the reference value. However, noise generated when the back pressure valve is operated is reduced as the response speed at which the back pressure valve is controlled is reduced. Thus, it is preferable that the control constant of the back pressure valve be adjusted to the compensation value when there is the need to reduce noise generated from the engine and operate the back pressure valve.

A control method according to an exemplary embodiment further includes operation S10 of, before the sensing operation S20 is conducted, determining the position of a shift gear. When a result of the determination operation S10 is a determination that the shift gear is in a P or N position, the first control operation S50 is conducted.

Generally, when the shift gear is in the P or N position, the vehicle is stopped or being moved by inertial force. In this state, the noise level generated from the engine is comparatively low. Here, when the driver presses the accelerator pedal, noise may be generated by operation of the back pressure valve. Given this, it is preferable that the control constant of the back pressure valve be adjusted to an appropriate value depending on the position of the shift gear, so that noise of the vehicle can be reduced.

In contrast, when a result of the determination operation S10 is a determination that the shift gear is in a D or R position, the sensing operation S20 is conducted. When the shift gear is in the D or R position, the vehicle is moving, and the noise of the engine is increased to an appropriate level. Thus, although the back pressure valve is operated, noise generated from the operation of the back pressure valve is drowned out by the noise of the engine, and the driver will not be able to recognize the noise generated from the back pressure valve. Therefore, in an exemplary form of the present disclosure, logic of sensing the engine speed and the fuel injection rate and comparing them with respective presets is conducted.

When, a result of the comparison operation S30 indicates that the engine speed is the preset speed or more, or that the fuel injection rate is the preset injection rate or more, a control method according to an exemplary form of the present disclosure may further include operation S40 of sensing whether the vehicle satisfies EGR valve shut-off conditions. If a result of the sensing operation S40 indicates that the vehicle satisfies the EGR valve shut-off conditions, the first control operation S50 is conducted.

Depending on conditions of the vehicle, when the air flow rate is controlled by the back pressure valve, the EGR valve might not be used. For example, when the vehicle satisfies the EGR valve shut-off conditions, that is, abnormal driving conditions such as tip-out, rapid acceleration, idling for a long time, cold start, gear shifting, etc., the EGR valve and the back pressure valve are controlled to preset defaults, and thus shut off.

Here, the controller is configured to compensate for the control constant for controlling the back pressure valve, and thus is configured to adjust the control constant to the compensation value, thereby reducing noise generated when the back pressure valve is closed or opened.

Meanwhile, when a result of the sensing operation S40 indicates that the vehicle does not satisfy the EGR valve shut-off conditions, the control method may further include a second control operation S60 of controlling the control constant of the back pressure valve to be set to the reference value.

That is, when, through the determination operation S10, the comparison operation S30, and the sensing operation S40, it is determined that the vehicle moves normally, and the EGR valve is operated normally, the controller is configured to set the reference value, which provides high responsiveness, as the control constant of the back pressure valve, and thus to use the control constant set to the reference value to control the back pressure valve. As such, when the vehicle is under conditions in which the driver cannot recognize noise generated by the operation of the back pressure valve, the controller is configured to increase the response speed at which the back pressure valve is controlled, thus preventing a failure from being caused when controlling the back pressure valve.

In the second control operation S60, when, at an initial stage, the control constant of the back pressure valve is set to the compensation value, the control constant is controlled in such a way that it remains set to the compensation value for a predetermined time, and is then changed to the reference value.

That is, when it is required to return responsiveness of the back pressure valve to its original normal value, the control constant remains set to the compensation value for a predetermined time before being changed to the reference value, rather than being directly changed to the reference value. Thereby, an excessively rapid increase of the control response speed of the back pressure valve can be prevented, and thus noise generated by the operation of the back pressure valve can be prevented.

As described above, in a method for controlling a back pressure valve according to the present disclosure, a control constant of the back pressure valve is controlled to be varied depending on an engine speed, a fuel injection rate, a position of shift gear, and shut-off conditions of an EGR valve. The problem of noise generated from the back pressure valve can be solved, and responsiveness of the back pressure valve can be maintained at the same level as that of the conventional technique.

Although exemplary forms of the present disclosure have been described for illustrative purposes, those skilled in the art will appreciate that various modifications, additions and substitutions are possible, without departing from the scope and spirit of disclosure as described in the accompanying claims.

What is claimed is:

1. A control method of a back pressure valve using a controller of an electronic engine control unit that is in communication with an engine and having a first sensor and a second sensor to prevent noise of the engine from being generated, wherein the controller includes a control constant of the back pressure valve to control the back pressure valve, the control constant having a reference value and a compensation value that is less than the reference value, the control method comprising:
    an operation of sensing an engine speed by the first sensor and a fuel injection rate by the second sensor;
    an operation of, after the operation of sensing, comparing, by the controller, the engine speed with a preset speed and comparing the fuel injection rate with a preset injection rate;
    a first control operation of, when a result of the operation of comparing indicates that the engine speed is less than the preset speed and that the fuel injection rate is less than the preset injection rate, controlling, by the controller, the control constant to be set to the compensation value;
    adjusting, by the controller, a closing timing of the back pressure valve based on the compensation value;
    an operation of, when a result of the operation of comparing indicates that the engine speed is the preset speed or more, or that the fuel injection rate is the preset injection rate or more, sensing whether a vehicle satisfies an exhaust gas recirculation (EGR) valve shut-off condition; and
    a second control operation of, when a result of the operation of sensing whether the vehicle satisfies the EGR valve shut-off condition indicates that the vehicle does not satisfy the EGR valve shut-off condition, controlling the control constant of the back pressure valve to be set to the reference value,
    wherein in the second control operation, when, at an initial stage, the control constant of the back pressure valve is set to the compensation value, the control constant remains at the compensation value for a predetermined time, and is then changed to the reference value when the predetermined time expires, adjusting the closing timing of the back pressure valve based on the reference value.

2. The control method of claim 1, further comprising:
    an operation of, before the operation of sensing, determining a position of a shift gear,
    wherein when a result of the operation of determining is a determination that the shift gear is in a park (P) or neutral (N) position, the first control operation is conducted.

3. The control method of claim 2, wherein when a result of the operation of determining is a determination that the shift gear is in a drive (D) or reverse (R) position, the operation of sensing is conducted.

4. The control method of claim 1, wherein when the result of the operation of sensing whether the vehicle satisfies the EGR valve shut-off condition indicates that the vehicle satisfies the EGR valve shut-off condition, the first control operation is conducted.

* * * * *